Sept. 21, 1965          B. T. WALL          3,207,384
FLUID METERING DEVICE WITH CONDUIT FLUSHING BY-PASS
Filed April 30, 1964
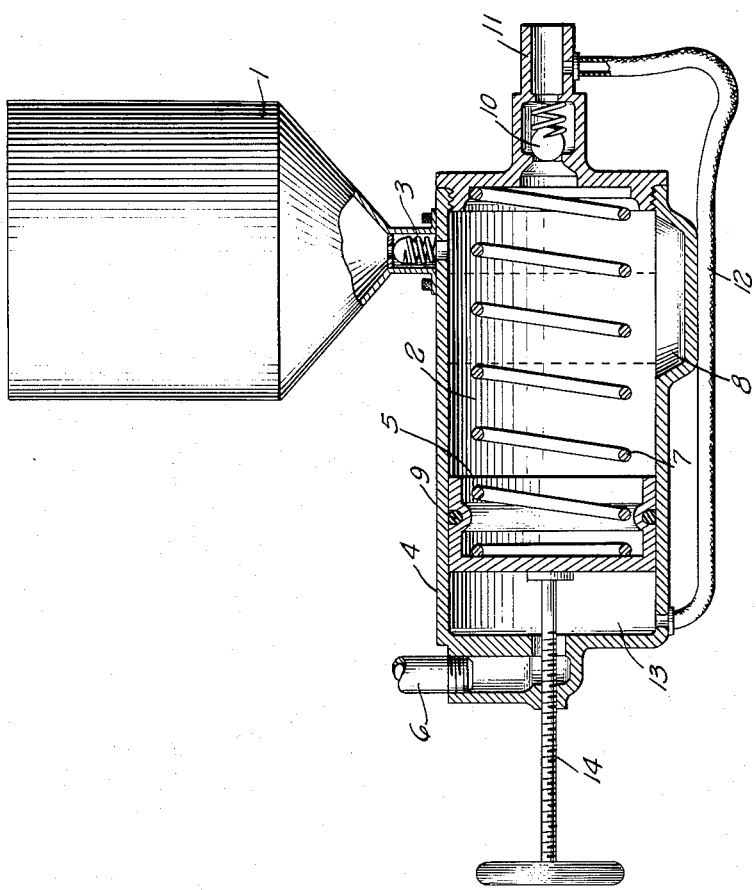
INVENTOR
Byron T. Wall United States Patent Office 3,207,384
Patented Sept. 21, 1965

3,207,384
FLUID METERING DEVICE WITH CONDUIT
FLUSHING BY-PASS
Byron T. Wall, 143—20 Franklin Ave., New York, N.Y.
Filed Apr. 30, 1964, Ser. No. 364,888
3 Claims. (Cl. 222—318)

This invention relates to a device designed to measure predetermined amounts of liquid such as detergents or other fluids and can be set up in units of one or more as needed to measure a single liquid or combinations of liquids and add them to other materials or liquids.

In operation the device of the invention can be set up and timed as to completely flush the carrier lines after each operation. This is particularly desirable where caustic or corrosive materials are involved. It results in longer trouble-free service and life of parts coming in contact with such caustic or corrosive liquids. It may also provide for automatic addition of detergents or other fluids from a large supply tank or container by programming it into the automatic cycle or timing device. The valve to control the operation can be any type of the many available on the market depending upon the type of service desired, manual, solenoid, and the like. The amount of fluid dispensed by the unit may be varied as well as the amount of fluid into which the preset amount of detergent or the like is added by the movement of a metering piston. This means that the unit may be set to compensate for variations in requirements such as water hardness or other conditions which might arise. Those parts coming into direct and constant contact with full strength solutions, as would be the case at the container and entrance to the metering device, as well as the cylinder, piston and related components, will be made of material resistant to corrosion from such agents.

The foregoing features and advantages of the invention will become apparent from the following detailed description, taken in conjunction with the drawing, which shows a side view, partly in section, of a device embodying the invention.

Referring to the drawing, numeral 1 is a container adapted to hold a liquid to be dispensed in measured amounts. Container 1 is connected with a cavity or measuring chamber 2 in a cylinder 4 through a check valve 3 which permits flow from container 1 into cylinder 4 but not vice versa. Within the cylinder 4 is a piston 5 which is reciprocable therein and biased to a normal position near an inlet line 6 remote from check valve 3 by a spring 7. A by-pass 8 is provided which has an inlet in the wall of the cylinder in a position located in the measuring chamber 2 in the normal position of the piston but in a pressure chamber 13 when the piston is near the end of its stroke to diminish the volume of the measuring chamber. The outlet of the by-pass is always in the measuring chamber. A simple form of by-pass is an open groove in the wall of the cylinder as shown in the drawing. An O-ring 9 or the like is provided in piston 5 to make fluid-tight seal between chambers 2 and 13. An outlet from the measuring chamber 2 is provided through a check valve 10 to a discharge line 11. The check valve 10 permits flow from cavity 2 into line 11 but not vice versa. A bleeder line 12 is provided which has an inlet in the pressure chamber 13 and an outlet in discharge line 11 beyond check valve 10. Means are provided, e.g., a screw 14, to adjust the normal position of the piston to give any desired volume to the measuring chamber.

The various components of this device operate as follows: When detergent solution or other fluid is placed in the container 1 it flows into the cavity or measuring chamber 2 past check valve 3. The piston 5 is thrust toward the inlet 6 by spring 7. When sufficient pressure is applied by liquid, e.g., water, flowing through inlet 6 the piston 5 is forced toward and compresses the spring 7 until it passes the opening of the by-pass 8 as indicated by broken lines. Any fluid left in the cavity or cylinder 2 is flushed past check valve 10 into discharge line 11. Movement of piston 5 had forced most of the fluid from cavity 2 past check valve 10 and into discharge line 11. The period of time inlet 6 is kept under pressure determines the amount of water or other liquid which is allowed to flow through by-pass 8 and bleeder 12. If this liquid is water, for example, the unit is cleared of detergent solution or other fluid, this having been displaced by the influx of liquid which entered inlet 6. After the inlet 6 is closed and flow ceases the spring returns piston 5 by venting fluid which had forced it to compress spring 7 and is now in cavity 13 to discharge through bleeder line 12. This bleeder line is sufficiently restricted in its flow that it passes only a small amount of liquid during the period of pressure on piston 5 by liquid entering through line 6. This tends to wet the discharge line 11 and dilute liquids coming into contact with the walls. By turning adjusting screw 14 the piston return stroke can be varied and thus alter the volume of detergent or liquid entering chamber 13. A valve (not shown) attached to inlet 6 controls the operation. This valve may be any one of many such as solenoid operated, manually operated and the like. The device can be especially effective for the addition of syrups in automatic drink dispensers and the like. The rinsing action is a most desirable one. Many different flavors can be metered through the same unit because of this rinsing feature after each operation. This means that by providing a number of containers with a selective valve leading to cavity 2 from each such container there will be a minimum carry-over of the last used flavor to the one to be mixed.

While I have mentioned specifically two ways in which this may be used it is obvious that there are many others. These have been used to clarify the operation of this invention.

What I claim to be new and useful is:

1. A liquid measuring device comprising
   a cylinder,
   a piston slidable in said cylinder dividing it into a measuring chamber and a pressure chamber,
   means biasing said piston to a normal position to enlarge said measuring chamber and reduce the pressure chamber,
   a check valve controlled inlet line to said measuring chamber adapted to be connected to a supply of liquid to be dispensed in measured quantities from said measuring chamber,
   a check valve controlled outlet line from said measuring chamber,
   a valve controlled inlet line to said pressure chamber adapted to be connected to a water line under pressure,
   a by pass for said cyinder having an inlet in the wall of said cylinder in a position located in the measuring chamber in the normal position of the piston but in the pressure chamber when the piston is near the end of its stroke to diminish the volume of the measuring chamber and an outlet always in said measuring chamber, said by pass constiuting an outlet from said pressure chamber through said measuring chamber, and
   a bleeder line connecting the pressure chamber with the outlet line from said measuring chamber downstream of the check valve therein.

2. A measuring device as set forth in claim 1 in which means are provided for adjusting the normal position of said piston to control the volume of the measuring chamber when the piston is in its normal position.

3. A measuring device as set forth in claim 1 in which the by pass is an open groove in the wall of said cylinder having an axial length greater than the length of said piston, whereby on opening the inlet valve to said pressure chamber water from the water line connected thereto will flow into the pressure chamber, move the piston from its normal position to the end of its stroke forcing liquid from said measuring chamber into the outlet thereof until the by pass inlet opens and permits water to flow from the pressure chamber through the by pass into the measuring chamber to purge the liquid from it into the measuring chamber outlet, and upon closing the said inlet valve to the pressure chamber the biasing means returns the piston to its normal position forcing water from the pressure chamber through the bleeder line and drawing liquid into the measuring chamber through the check valve controlled inlet thereto from the source of supply connected thereto.

References Cited by the Examiner
UNITED STATES PATENTS

| | | | |
|---|---|---|---|
| 932,386 | 8/09 | Gross | 222—129.2 |
| 1,304,710 | 5/19 | Seidler | 222—334 X |
| 3,085,715 | 4/63 | Douglas | 222—318 X |

H. HENSON WOOD, JR., *Primary Examiner.*

LOUIS J. DEMBO, *Examiner.*